United States Patent
Wong et al.

(10) Patent No.: US 9,456,055 B2
(45) Date of Patent: Sep. 27, 2016

(54) APPARATUS AND METHOD FOR COMMUNICATING MEDIA CONTENT

(71) Applicants: Sony Corporation, Tokyo (JP); Sony Network Entertainment International LLC, Los Angeles, CA (US)

(72) Inventors: Ling Jun Wong, Champaign, IL (US); Charles McCoy, San Diego, CA (US); True Xiong, San Diego, CA (US)

(73) Assignees: SONY NETWORK ENTERTAINMENT INTERNATIONAL LLC, Los Angeles, CA (US); SONY CORPORATION, Tokyo (JP)

( * ) Notice: Subject to any disclaimer, the term of this patent is extended or adjusted under 35 U.S.C. 154(b) by 285 days.

(21) Appl. No.: 13/679,547

(22) Filed: Nov. 16, 2012

(65) Prior Publication Data

US 2014/0143384 A1    May 22, 2014

(51) Int. Cl.
*G06F 15/173* (2006.01)
*H04L 29/08* (2006.01)
*H04L 29/06* (2006.01)

(52) U.S. Cl.
CPC ............. *H04L 67/34* (2013.01); *H04L 65/602* (2013.01); *H04L 65/607* (2013.01)

(58) Field of Classification Search
CPC ........................ H04L 67/26; G06F 17/30265
USPC .................................................. 709/217, 219
See application file for complete search history.

(56) References Cited

U.S. PATENT DOCUMENTS

| 6,263,502 | B1 | 7/2001 | Morrison et al. | |
| 2003/0007001 | A1* | 1/2003 | Zimmerman | H04N 5/4401 715/716 |
| 2008/0118086 | A1* | 5/2008 | Krig | H04N 5/60 381/104 |
| 2010/0002606 | A1* | 1/2010 | Preis | H04Q 3/0025 370/259 |
| 2010/0011119 | A1* | 1/2010 | Knowlton | H04L 47/10 709/235 |
| 2012/0321273 | A1* | 12/2012 | Messmer | G11B 27/031 386/224 |

FOREIGN PATENT DOCUMENTS

| EP | 1830570 A | 9/2007 |
| EP | 2106139 A | 9/2009 |

* cited by examiner

*Primary Examiner* — Wing F Chan
*Assistant Examiner* — Andrew Woo
(74) *Attorney, Agent, or Firm* — Chip Law Group

(57) ABSTRACT

Certain aspects of a method and apparatus for communicating media content may include a server communicatively coupled to a plurality of content rendering devices. One or more processors in the server may be operable to determine a set of configuration settings associated with the media content based on a set of parameters. The server may encode the media content and the determined set of configuration settings to generate an encoded media content. The determined set of configuration settings may be included in a header section of the encoded media content. The server may transmit the encoded media content to at least one of the plurality of content rendering devices.

19 Claims, 7 Drawing Sheets

APPARATUS AND METHOD FOR COMMUNICATING MEDIA CONTENT

CROSS-REFERENCE TO RELATED APPLICATIONS/INCORPORATION BY REFERENCE

None

FIELD

Certain embodiments of the disclosure relate to an apparatus and a method for communicating media content. More specifically, certain embodiments of the disclosure relate to a method and apparatus for communicating media content with optimal configuration settings.

BACKGROUND

The advancements in media rendering technologies have enabled a user to experience media content using a variety of content rendering devices, such as, but not limited to, a television, a laptop, and a Smartphone. Further, the user may experience the media content in different environments, such as, but not limited to, a dark room, a large hall, and a vehicle. Since the media content may be encoded for a pre-defined environment or content rendering device, the user may feel dissatisfied with different media consumption experiences across different content rendering devices and/or environments.

Further limitations and disadvantages of conventional and traditional approaches will become apparent to one of skill in the art, through comparison of such systems with some aspects of the present disclosure as set forth in the remainder of the present application with reference to the drawings.

SUMMARY

An apparatus and/or method is provided for communicating media content substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain implementations may be found in an apparatus and/or method for communicating media content. Exemplary aspects of the disclosure may include a server communicably coupled to a plurality of content rendering devices. In an embodiment, the server may determine a set of configuration settings associated with the media content based on a set of parameters. The determined set of configuration settings may be included in a file. The server may encode the media content and the file to generate an encoded media content. The server may transmit the encoded media content to at least one of the plurality of content rendering devices.

Exemplary aspects of disclosure may include a content rendering device communicatively coupled to a server. In an embodiment, the content rendering device may receive an encoded media content from the server. The encoded media content may comprise metadata associated with a set of configuration settings in a header section of the encoded media content. The content rendering device may decode the encoded media content to determine the set of configuration settings. The content rendering device may render the media content based on the determined set of configuration settings.

The metadata may include one or more of external storage location of the set of configuration settings, a parsing specification for parsing the header section, a minimum threshold and a maximum threshold for each of the set of configuration settings, and caching information associated with the header section of said encoded media content. In an embodiment, the metadata may include the set of configuration settings.

The set of configuration settings may include one or more of a volume setting, a contrast setting, a brightness setting, an aspect ratio setting, a surround sound setting, a refresh rate setting, a color setting, a resolution setting, a zoom setting, a font setting, and a page view setting. Notwithstanding the above examples, the set of configuration settings may include any other setting that effect the media consumption experience.

In an embodiment, the content rendering device may determine a set of environmental factors associated with the content rendering device. The content rendering device may modify the set of configuration settings based on the set of environmental factors. In another embodiment, the content rendering device may receive a user input for applying the set of configuration settings. The content rendering device may modify the set of configuration settings based on the user input.

Figure 1:
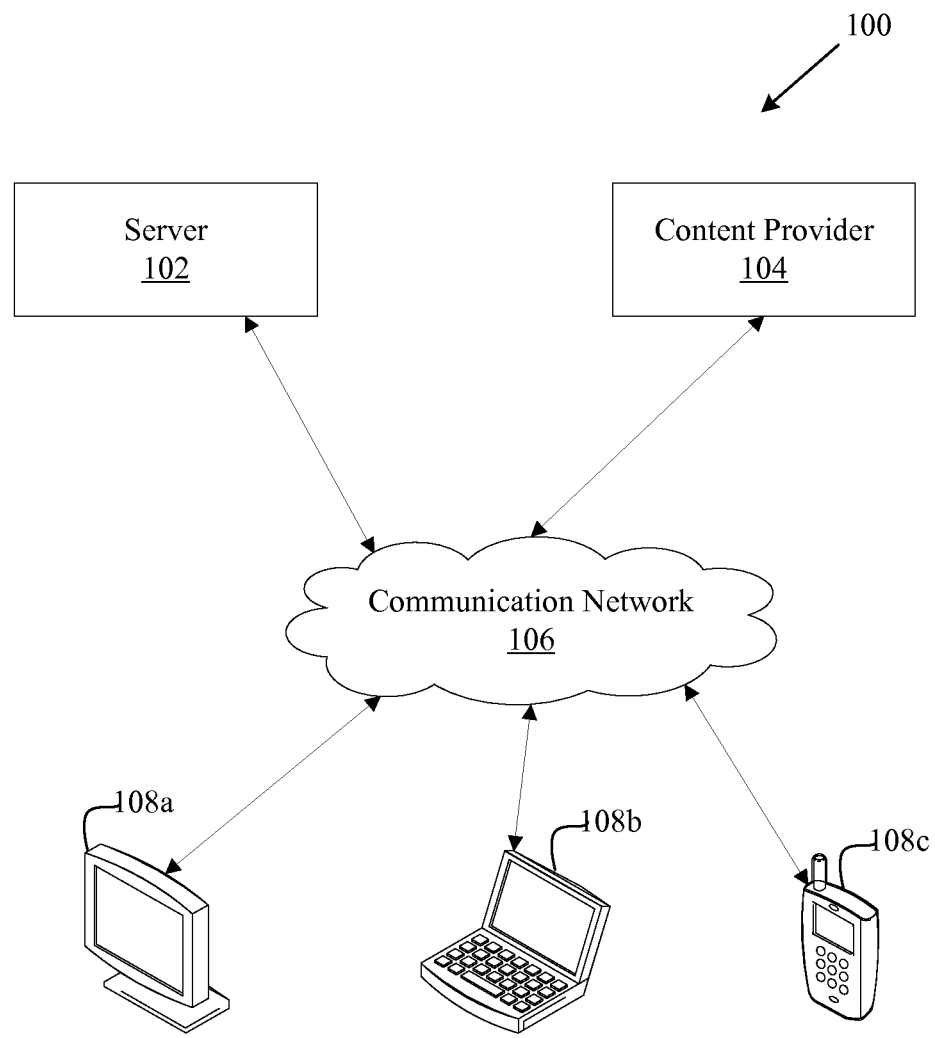
FIG. 1 is a block diagram illustrating a computing environment for communicating media content, in accordance with an embodiment of the disclosure.

FIG. 1 is a block diagram illustrating a computing environment for communicating media content, in accordance with an embodiment of the disclosure. Referring to FIG. 1, there is shown a computing environment 100. The computing environment 100 may comprise a server 102, a content provider 104, a communication network 106, and a plurality of content rendering devices, such as 108a, 108b, and 108c (collectively referred to as content rendering devices 108).

The server 102 may comprise suitable logic, circuitry, interfaces, applications/software and/or code that may enable processing and transmission of media content directly to the plurality of content rendering devices 108, or via the communication network 106. In an embodiment, the server 102 may be implemented as a cloud-based server. The server 102 may host a library of media content or may have access to a third-party media content library. In an embodiment, the server 102 may stream media content in real time to the one or more content rendering devices 108, over the communication network 106. The server 102 may be implemented as a cluster of multiple computing devices or servers.

The content provider 104 may comprise suitable logic, circuitry, interfaces, and/or code that may enable media content production, media content hosting, and/or media content distribution. In an embodiment, the content provider 104 may host an online repository of media content that may be directly accessed on a subscription basis by the content rendering devices 108. In an embodiment, the server 102 may distribute media content hosted by the content provider 104 to the content rendering devices 108.

The communication network 106 may include a medium through which various content rendering devices 108 in the computing environment 100 may receive media content. Examples of the communication network 106 may include, but are not limited to, the Internet, a Wireless Fidelity (WiFi) network, a Wireless Local Area Network (WLAN), a Local Area Network (LAN), a telephone line (POTS), or a Metropolitan Area Network (MAN). Various devices in the computing environment 100 may be operable to connect to the communication network 106, in accordance with various wired and wireless communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, Infra Red (IR), IEEE 802.11, 802.16, cellular communication protocols, and/or Bluetooth (BT) communication protocols.

The content rendering devices 108 may include one or more of a computer, a smart phone, a mobile device, a personal digital assistant (PDA), a laptop, a tablet PC, a television, wireless speakers, a digital media center, a car stereo system, and/or a Blu-ray disc player. Notwithstanding, the disclosure may not be so limited and other types of content rendering devices may be communicatively coupled to the server 102, without limiting the scope of the disclosure. The content rendering devices 108 may include any computing device capable of receiving and rendering media content. The content rendering devices 108 may implement various communication protocols for transmission and/or reception of media content, data, and instructions via the communication network 106. The content rendering devices 108 may implement various media content rendering platforms and applications to render media content of various types and formats. The media content may include, but is not limited to, video content, audio content, audio-visual content, a web page, an image, and/or live broadcast content.

In operation, the server 102 may determine a set of configuration settings associated with the media content based on a set of parameters. The server 102 may encode the media content and the determined set of configuration settings to generate encoded media content. The server 102 may transmit the encoded media content to at least one of the plurality of content rendering devices 108.

The set of configuration settings may define rendering characteristics of the media content when the media content is rendered across different content rendering devices 108 and/or in different rendering environments. Rendering environments may correspond to location of content rendering, for example, a hall, a living room, and/or a vehicle. In general, every content rendering device and/or rendering environment may have a preferred set of configuration settings that may result in optimal rendering of the media content. The set of configuration settings may include one or more of a volume setting, a contrast setting, a brightness setting, an aspect-ratio setting, a surround sound setting, a refresh rate setting, a color setting, a resolution setting, a zoom setting, a font setting, and/or a page view setting. The set of parameters may include one or more of a device type associated with the plurality of content rendering devices 108, a content type associated with the media content, and a history of configuration settings associated with the plurality of content rendering devices 108. The set of parameters may also include a bit rate associated with the media content, a user profile associated with each of the content rendering devices 108 and/or a set of environmental factors associated with the content rendering devices 108.

In an embodiment, the server 102 may determine the device type based on a request for media content from one or more of the content rendering devices 108. The server 102 may track the content usage history for one or more of the content rendering devices 108. The server 102 may receive the history of configuration settings associated with one or more of the content rendering devices 108. The server 102 may receive, in real time, the set of environmental factors associated with one or more of the content rendering devices 108.

In an embodiment, the server 102 may be operable to include the determined set of configuration settings in a header section of the media content. In an embodiment, the server 102 may include a metadata associated with the determined set of configuration settings in the header section of the media content. The metadata may include one or more of an external storage location of the determined set of configuration settings, a parsing specification for parsing the header section, a minimum threshold and a maximum threshold for each of the determined set of configuration settings, and caching information associated with the header section of the media content.

In an embodiment, the server 102 may encode the media content that includes one or more of the metadata or the set of configuration settings in the header section of the media content. Such encoded media content may be transmitted by the server 102 in response to a request from a content rendering device (for example, 108a). The content rendering device 108a may receive and decode the encoded media content to determine the metadata and/or the set of configuration settings. In an embodiment, the content rendering device 108a may parse the header section of the media content based on the determined metadata. The content rendering device 108a may apply the set of configuration settings while rendering the media content. In an embodiment, the content rendering device 108a may render the media content based on a pre-defined or a current set of configuration settings of the content rendering device 108a. In another embodiment, the content rendering device 108a may partially apply the determined set of configuration settings while rendering the media content. Such partial application of the determined set of configuration settings may be based on a user input and/or environmental factors related to the content rendering device 108a.

In an embodiment, the content provider 104 may determine the set of configuration settings associated with the media content based on the set of parameters. The content provider 104 may encode the media content and the determined set of configuration settings to generate encoded media content. The content provider 104 may transmit the encoded media content to a content rendering device (for example, 108*b*). In an embodiment, the content provider 104 may host encoded media content that may be accessed by the server 102. The server 102 may stream such hosted content to one or more content rendering devices 108. At least some of the embodiments disclosed, with respect to the server 102, may be implemented in the content provider 104, to realize similar functionality without departing from the scope of the disclosure.

Figure 2:
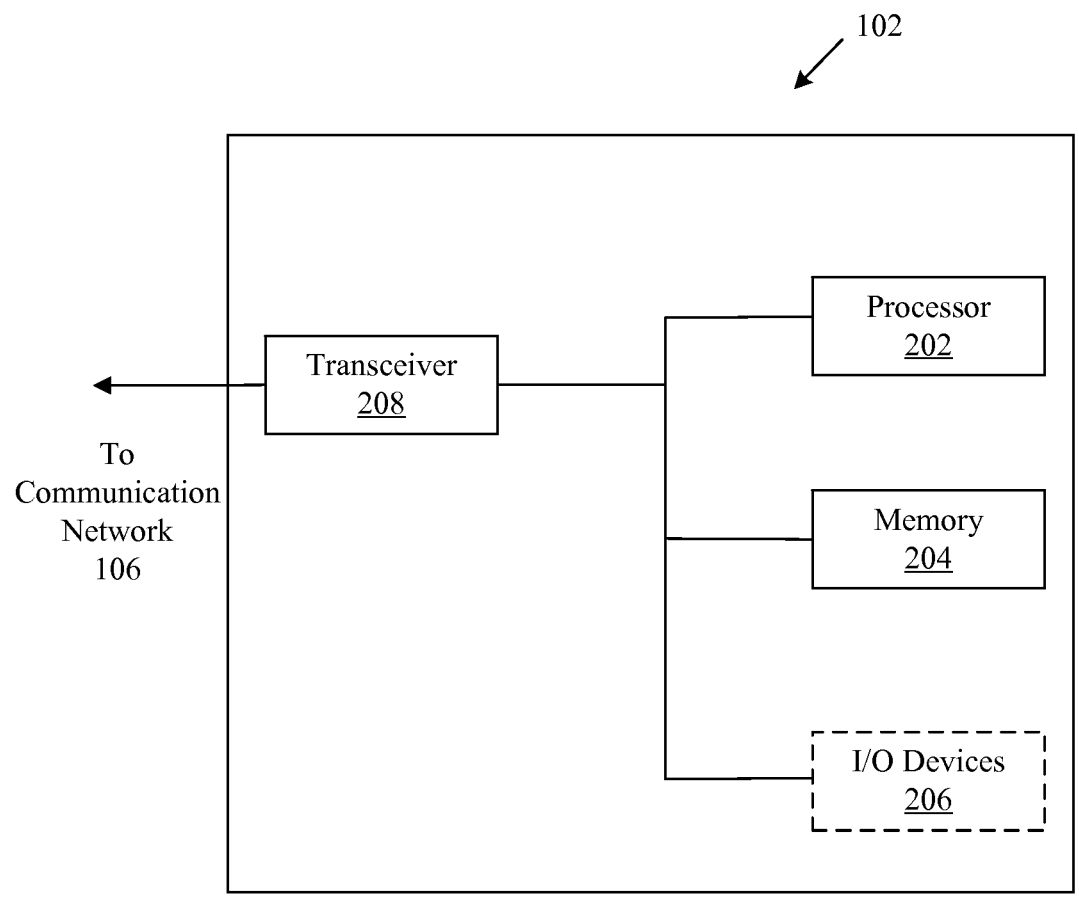
FIG. 2 is a block diagram illustrating a server for communicating media content, in accordance with an embodiment of the disclosure.

FIG. 2 is a block diagram of the server, in accordance with an embodiment of the disclosure. FIG. 2 is explained in conjunction with elements from FIG. 1. Referring to FIG. 2, there is shown the server 102. The server 102 may include a processor 202, a memory 204, Input-Output (I/O) devices 206, and a transceiver 208.

The processor 202 may be communicatively coupled to the memory 204, and the I/O devices 206. Further, the transceiver 208 may be communicatively coupled to the processor 202, the memory 204, and the I/O devices 206.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a RISC processor, an ASIC processor, a CISC processor, or any other processor.

The memory 204 may comprise suitable logic, circuitry, interfaces, and/or code that may be operable to store the received set of instructions. The memory 204 may be implemented based on, but not limited to, a Random Access Memory (RAM), a Read-Only Memory (ROM), a Hard Disk Drive (HDD), a storage server and/or a secure digital (SD) card. The memory 204 may also comprise a media content library that may host media content and may also store corresponding set of configuration settings and corresponding metadata.

The I/O devices 206 may comprise various input and output devices operably connected to the processor 202. Examples of input devices include, but are not limited to, a keyboard, a mouse, a joystick, a touch screen, a microphone, a camera, a motion sensor, a light sensor, and/or a docking station. Examples of output devices include, but are not limited to, a display and a speaker. The I/O devices 206 may be integrated with the server 102 or may be communicably connected to the I/O devices 206 via one or more communication ports.

The transceiver 208 may comprise suitable logic, circuitry, interfaces, and/or code that may be operable to communicate with the content rendering devices 108 and the content provider 104.

In operation, the processor 202 may be operable to receive a request for media content from a content rendering device (for example, 108*a*). The processor 202 may be operable to determine a set of configuration settings associated with the media content based on a set of parameters. In an embodiment, the processor 202 may include the set of configuration settings in the header section of the media content. The processor 202 may encode the media content (with the set of configuration settings in the header section) to generate the encoded media content. The server 102 may transmit the encoded media content to the requesting content rendering devices 108*a*. In an embodiment, the processor 202 may determine a metadata associated with the set of configuration settings. The processor 202 may include the metadata in the header section of the requested media content and encode the media content.

In an embodiment, the processor 202 may execute one or more rules that determine preferred and/or recommended set of configuration settings for various content types, device types, environmental factors, and/or past histories of settings used by the content rendering devices 108. In an embodiment, the processor 202 may enable a system administrator to create and/or modify the set of configuration settings associated with the media content. The processor 202 may enable the system administrator to create and/or modify the metadata. To this end, a user interface (UI) may be presented to the system administrator. Such a UI may include various configuration options for setting a value or a level for different configuration settings, selecting or deselecting one or more parameters and/or modify the parameter description. The UI may present tools and widgets that may be used to manually set the value or level of different configuration settings. Such manual manipulation of settings may be performed across different content types and/or device types. In addition, for the same content type, the settings may be set differently for different device types and vice versa.

In an embodiment, the processor 202 may receive historical values and/or current levels of settings from the content rendering devices 108. Such historical values and/or levels may indicate a user's preference for consumption of media content on the content rendering devices 108. In an embodiment, the processor 202 may set a minimum threshold and a maximum threshold for values or levels corresponding to one or more of the configuration settings.

In an embodiment, the processor 202 may store the current set of configuration settings (received from the content rendering devices 108) in the memory 204. The processor 202 may include a link to the storage location of the set of configuration settings in the header section of the media content. Such a link may be utilized by the content rendering devices 108 to download the set of configuration settings from the server 102. In an embodiment, the link may correspond to an external storage location in a database (not shown). The database may be accessed by the content rendering devices 108 to retrieve the set of configuration settings.

The processor 202 may also include a parsing specification for parsing the header section of the media content. The processor 202 may also specify and include details regarding a manner of applying the set of configuration settings while rendering the media content. For example, the set of configuration settings may be implemented from a particular frame in a video content. The processor 202 may specify a gradual change in the contrast settings from a current level (at the content rendering device 108*a*) to the desired level (as specified in the set of configuration settings). The user or the viewer may enjoy a seamless experience of watching the video content with such a gradual change in the contrast settings. In an embodiment, the processor 202 may also specify caching information associated with the header section of the media content. Such caching information may be included in the header section of the media content and may be utilized by the content rendering device (for example, 108*a*) to cache the header section of the received media content. In another embodiment, the processor 202 may define the set of configuration settings as a percentage value of the current configuration settings of the requesting content rendering device (for example, 108*a*). In an embodiment, the processor 202 may define the set of configuration settings as a percentage increase or decrease in value of the current configuration settings of the requesting content rendering device (for example, 108*a*).

In an embodiment, the processor 102 may be operable to manage a local or a remote database to store encoded media content, the set of configuration settings, and the set of parameters. Such a database may be configured to store media content (before and after encoding), historical data of content rendering devices 108, content types, and other metadata, for example. One or more of the plurality of content rendering devices 108 may be operable to access media content by sending a request to the server 102. The processor 202 may be operable to process such requests and stream the media content to the requesting content rendering devices. The processor 202 may implement various known standards and protocols for streaming of media content.

In an embodiment, the processor 202 may implement various heuristics to analyze the metadata to determine the optimal value or level for each of the set of configuration settings. The processor 202 may customize the optimal values across different device types and/or content types. The processor 202 may also generate configuration settings in runtime based on such heuristics. For example, the processor 202 may determine an optimal value (for set of configuration settings) based on a time of the day such as morning, afternoon, evening, and week. For example, volume level may be set to different values during different times of the day as a person's mood may change throughout the day. The processor 202 may be operable to consider various other factors that may have an impact on the content consumption and the associated experience. Such other factors may include user's interest, choices, preferences, user's surroundings, user's social circle, user's geographical location, user's device specifications, content provider's recommendations, and the like.

Figure 3:
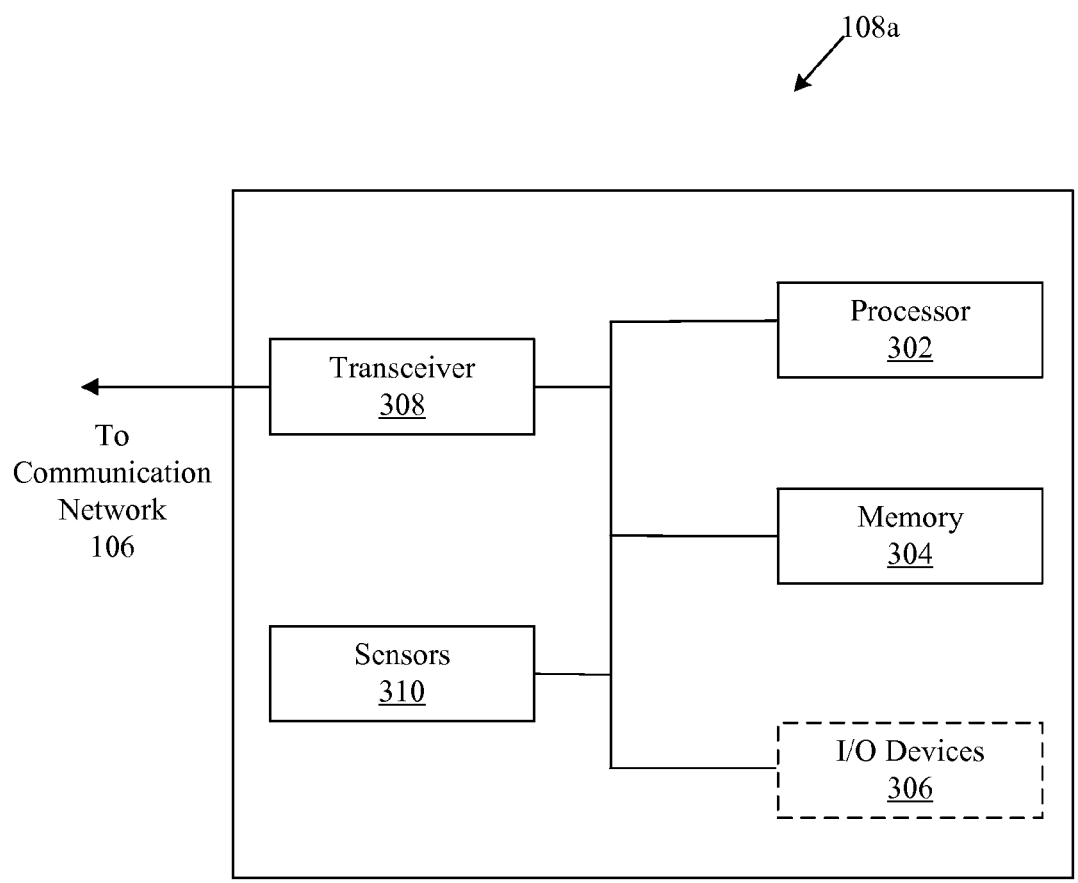
FIG. 3 is a block diagram illustrating a content rendering device, in accordance with an embodiment of the disclosure.

FIG. 3 is a block diagram of the content rendering device, in accordance with an embodiment of the disclosure. FIG. 3 is explained in conjunction with elements from FIG. 1 and FIG. 2. Referring to FIG. 3, there is shown the content rendering device 108a. The content rendering device 108a may include a processor 302, a memory 304, Input-Output (I/O) devices 306, a transceiver 308 and one or more sensors 310.

The processor 302 may be communicatively coupled to the memory 304, and the I/O devices 306. Further, the transceiver 308 may be communicatively coupled to the processor 302, the memory 304, and the I/O devices 306. The one or more sensors 310 may be communicatively coupled to the processor 302, the memory 304, and the I/O devices 306.

The processor 302 may comprise suitable logic, circuitry, interfaces, and/or code that may be operable to execute a set of instructions stored in the memory 304. The processor 302 may be implemented based on a number of processor technologies known in the art. Examples of processor 302 may be an X86-based processor, a RISC processor, an ASIC processor, a CISC processor, or any other processor.

The memory 304 may comprise suitable logic, circuitry, interfaces, and/or code that may be operable to store the received set of instructions. The memory 304 may be implemented based on, but not limited to, a Random Access Memory (RAM), a Read-Only Memory (ROM), a Hard Disk Drive (HDD), a storage server and/or a secure digital (SD) card.

The I/O devices 306 may comprise various input and output devices operably connected to the processor 302. Examples of input devices include, but are not limited to, a keyboard, a mouse, a joystick, a touch screen, a microphone, a camera, a motion sensor, a light sensor, and/or a docking station. Examples of output devices include, but are not limited to, a display and a speaker. The I/O devices 206 may be integrated with the server 102 or may be communicably connected to the I/O devices 206 via one or more communication ports.

The transceiver 308 may comprise suitable logic, circuitry, interfaces, and/or code that may be operable to communicate with the server 102 and the content provider 104.

The one or more sensors 310 may comprise suitable logic, circuitry, interfaces, and/or code that may be operable to sense environmental factors. Such environmental factors may include, but are not limited to, ambient light, noise levels in the surrounding of the content rendering, sound acoustics of the room, number of people in the room, and average viewing distance of viewers. Examples of sensors 310 may include a camera, a microphone, an accelerometer, and a light sensor.

In operation, the processor 302 may be operable to transmit a request for media content to the server 102 and/or the content provider 104. The processor 302 may receive the encoded media content from the server 102 or the content provider 104. In an embodiment, the encoded media content may comprise the metadata associated with the set of configuration settings in the header section of the media content. In another embodiment, the encoded media content may comprise the set of configuration settings in the header section of the media content. The processor 302 may decode the encoded media content to determine the metadata and/or set of configuration settings. The processor 302 may determine the set of configuration settings, based on the metadata. For example, the processor 302 may download the set of configuration settings based on the external storage location specified in the metadata. The processor 302 may render the decoded media content based on the determined set of configuration settings.

The metadata may include one or more of an external storage location of the set of configuration settings, a parsing specification for parsing the header section, a manner of applying the set of configuration settings, a minimum threshold and a maximum threshold for each of the set of configuration settings, and caching information associated with the header section of the media content. In another embodiment, the metadata may include the set of configuration settings.

The set of configuration settings may include one or more of a volume setting, a contrast setting, a brightness setting, an aspect ratio setting, a surround sound setting, a refresh rate setting, a color setting, a resolution setting, a zoom setting, a font setting, and a page view setting.

In an embodiment, the processor 302 may determine a set of environmental factors associated with said content rendering device, through the one or more sensors 310. Such environmental factors may have an impact on the experience of media consumption on the content rendering device 108a. The processor 302 may modify the set of configuration settings, based on the set of environmental factors. Such modifications may be performed prior to applying the determined set of configuration settings. For example, the processor 302 may determine that the content rendering devices 108 are located in a dark surrounding based on a signal from the light sensor. The processor 302 may determine a first level of contrast settings based on the determined set of configuration settings. The processor 302 may also determine a second level of contrast settings based on the signal from the light sensor. The processor 302 may compare the first level and the second level of contrast settings and adjust the contrast settings for the rendering of the media content based on the difference. In another embodiment, the sensors 310 may include a camera that can capture a photograph of the room or the surroundings. The processor 302 may apply various heuristics to determine environmental factors, such as the size of the room, surrounding noise, surrounding acoustic characteristics, lighting, viewing distance, and the number of people in the room.

In an embodiment, the processor 302 may be operable to receive a user input for applying the set of configuration settings. For example, the processor 302 may determine that the set of configuration settings are different from the current set of configuration settings of the content rendering device 108a. The processor 302 may prompt the user for an input to confirm the change in the current configuration settings (to the recommended set of configuration settings) of the content rendering device 108a. The user may provide input using the I/O devices 306. In an embodiment, a display screen of the content rendering device 108a may display a UI that presents options to either accept or reject any changes in the current configuration settings. The processor 302 may be operable to modify the set of configuration settings based on the user input. The processor 302 may override the set of configuration settings based on the user input and retain the current configuration settings of the content rendering device 108a. The processor 302 may store such user input and may transmit log reports of such user inputs to the server 102 as a feedback.

In an embodiment, the processor 302 may be operable to allow the user to modify the set of configuration settings in such a manner to include at least in part the current set of configuration settings. The processor 302 may be operable to allow the user to modify the current set of configuration settings. In another embodiment, the processor 302 may be operable to allow the user to selectively chose between the current set of configuration settings and the set of configuration settings received with the content.

In an embodiment, the processor 302 may determine the minimum threshold and the maximum threshold for the set of configuration settings from the metadata. The processor 302 may compare the current set of configuration settings with the minimum threshold and the maximum threshold. The processor 302 may modify the current configuration settings to reflect the determined set of configuration settings based on the comparison. For example, the processor 302 may adjust volume level for the media content based on such a comparison. The process for adjusting volume level for the media content in the content rendering device 108a will be explained with reference to FIG. 5.

In an embodiment, the processor 302 may decode newly received media content while rendering the current media content. The processor 302 may determine new set of configuration settings associated with the newly received media content. The processor 302 may be operable to detect a termination of the current rendering of the media content. Subsequently, the processor 302 may modify the set of configuration settings to match the determined new set of configuration settings and may render the newly received media content based on the modified set of configuration settings. In an embodiment, the processor 302 may determine that the new set of configuration settings and the current set of configuration settings are the same. In such an embodiment, the processor 302 may render the newly received content based on the previous set of configuration settings without any change. In an embodiment, the embodiment, the processor 302 may prompt a user to confirm settings for the newly received media content. In an embodiment, the processor 302 may apply a default set of configuration settings to the newly received media content, if there is no information available for the configuration settings. The processor 302 may also apply a previously stored set of configuration settings based on content type and/or content format.

Figure 4:
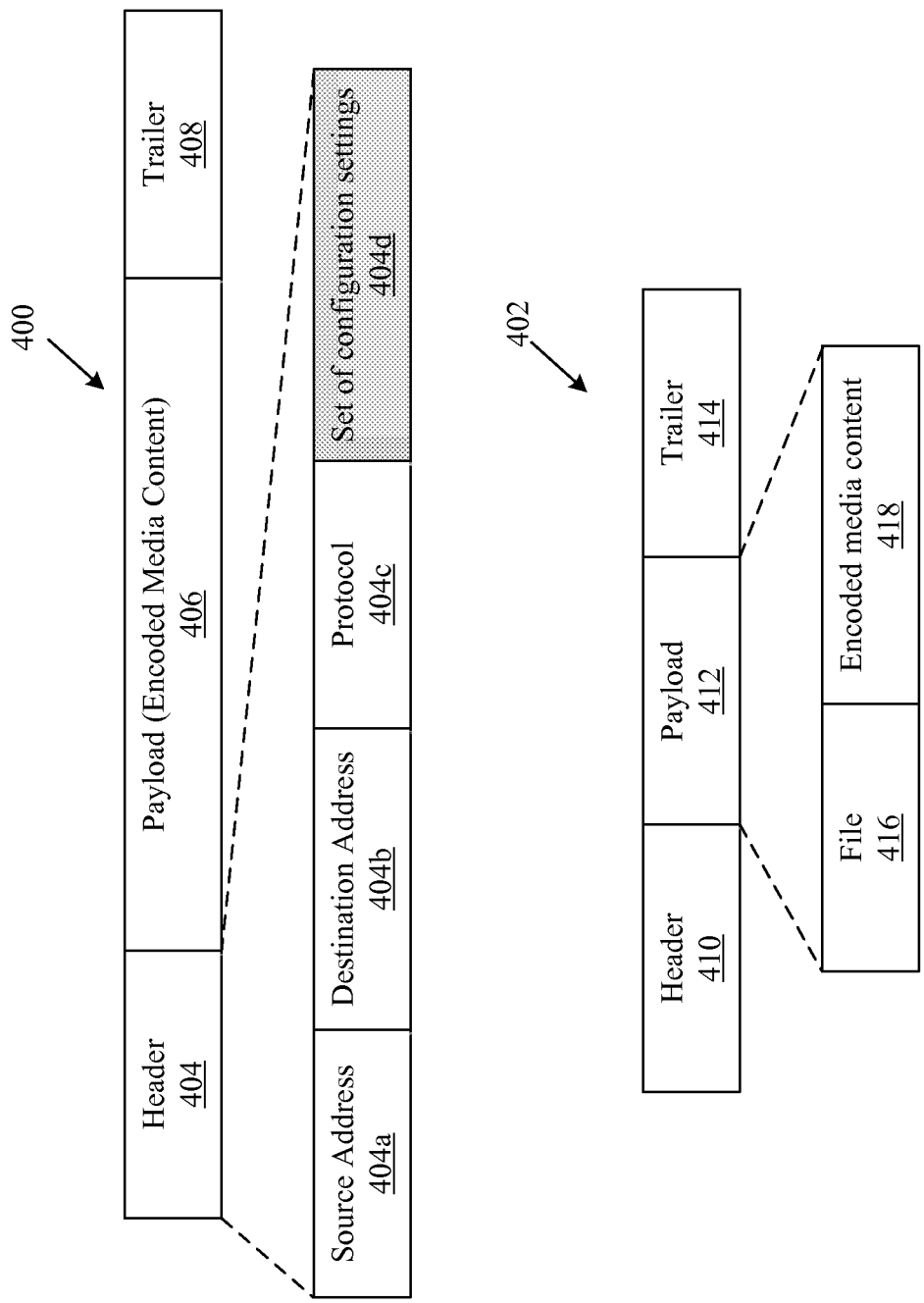
FIG. 4 is a diagram illustrating data frames, in accordance with various embodiments of the disclosure.

FIG. 4 is a diagram illustrating data frames 400 and 402 for communicating media content, in accordance with various embodiments of the disclosure. As shown, the data frame 400 may include a header field 404, a payload field 406, and a trailer field 408. In an embodiment, the header field 404 may include a source address field 404a, a destination address field 404b, a protocol field 404c, and the set of configuration settings 404d. The payload field 406 may include the encoded media content. The data frame 402 includes a header field 410, a payload field 412, and a trailer field 414. The payload field 412 may include a file field 416 and encoded media content 418. The file field 416 may include a metadata file and/or a configuration settings file that stores the set of configuration settings for the media content.

In an embodiment, the processor 202 may be configured to include the set of configuration settings in the header field 404 of the data frame 400. In another embodiment, the processor 202 may be configured to include the set of configuration settings in the payload field 412 of the data frame 402. The processor 202 may store the configuration settings in the file field 416. In an embodiment, the processor 202 may include metadata files in the header field 404 along with the set of configuration settings.

Figure 5:
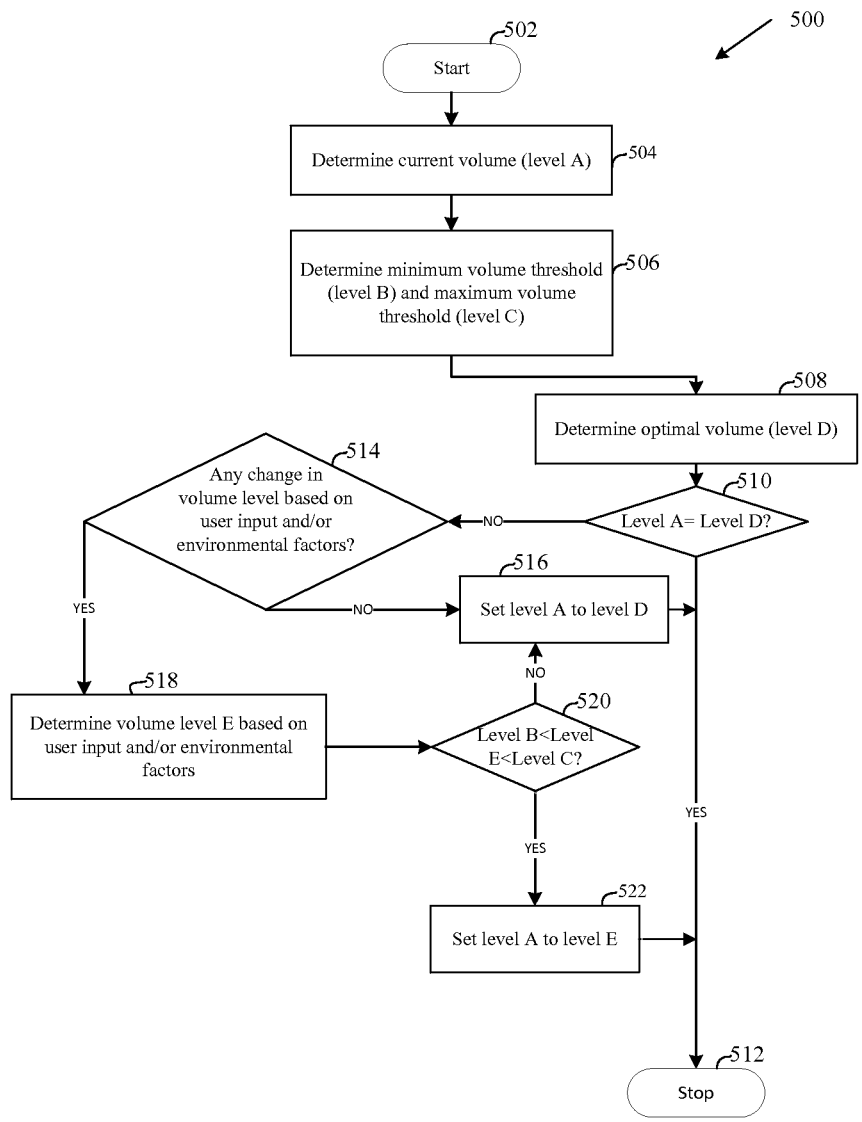
FIG. 5 is a diagram illustrating a process for adjusting volume level in a content rendering device, in accordance with an embodiment of the disclosure.

FIG. 5 is a diagram illustrating a process for adjusting volume level in a content rendering device, in accordance with an embodiment of the disclosure. As shown, the process starts at 502. At step 504, the processor 302 may determine the current volume (level A) set in the content rendering device 108a. At step 506, the processor 302 may determine a minimum volume threshold (level B) and a maximum volume threshold (level C) based on the set of configuration settings received from the server 102. At step 508, the processor 302 may determine the optimal volume (level D) for the media content based on the set of configuration settings. At step 510, the processor 302 may determine whether the current volume (level A) is equal to the optimal volume (level D). If the determination is positive, the process stops at 512, else the process proceeds to step 514.

At step 514, the processor 302 may determine whether the current volume has to be changed based on user input and/or environmental factors associated with the content rendering device 108a. If the determination is negative, the process proceeds to step 516. At step 516, the processor 302 may set the current volume to optimal volume (level D). The process stops at 512.

If the determination at step 514 is positive, the process proceeds to step 518. At step 518, the processor 302 determines volume level E based on the user input and/or the environmental factors. At step 520, the processor 302 determines whether volume level E lies between the minimum volume threshold (level B) and the maximum volume threshold (level C). If the determination is positive, the processor 302 may set the current volume to level E. The process stops at 512.

If the determination is negative at step 520, then the process proceeds to step 516, where the processor 302 may set the current volume to optimal volume (level D). The process stops at 512.

Figure 6:
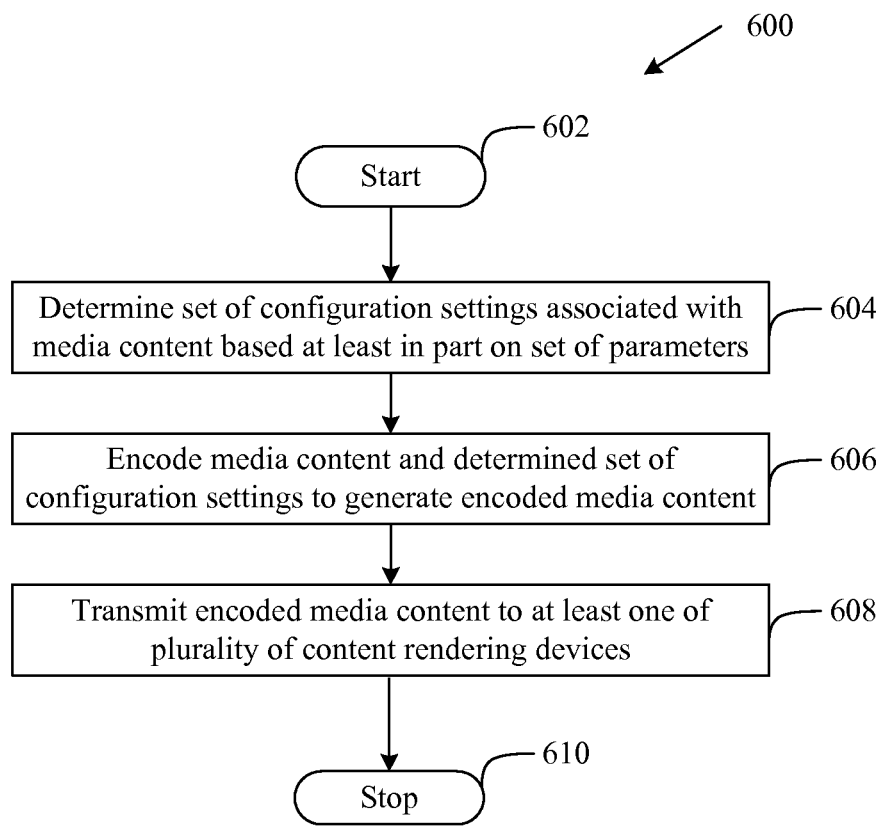
FIG. 6 is a diagram illustrating a method for communicating media content, in accordance with an embodiment of the disclosure.

FIG. 6 is a diagram illustrating a method 600 for communicating media content, in accordance with an embodiment of the disclosure. The method 600 may be implemented in the server 102 communicatively coupled to a plurality of content rendering devices 108. FIG. 6 will be described in conjunction with elements of FIG. 1 and FIG. 2.

The method 600 starts at 602. At step 604, a set of configuration settings associated with the media content may be determined by the server 102 based on a set of parameters. The media content may include one or more of a video content, an audio content, an audio-visual content, a web page, an image, and/or a live broadcast content. The set of configuration settings may include one or more of a volume setting, a contrast setting, a brightness setting, an aspect ratio setting, a surround sound setting, a refresh rate setting, a color setting, a resolution setting, a zoom setting, a font setting, and/or a page view setting. The set of parameters may include a device type associated with the plurality of content rendering devices 108, a content type associated with the media content, a history of configuration settings associated with the plurality of content rendering devices 108, a bit rate associated with the media content, and a set of environmental factors associated with the content rendering devices 108. In an embodiment, the server 102 may determine a common set of configuration settings for a single content type or for a single device type or a predefined combination of a content type and a device type. In an embodiment, the set of configuration settings may reflect optimal settings in which the media content may be best experienced.

At step 606, the media content and the determined set of configuration settings may be encoded by the server 102 to generate encoded media content. The processor 202 may include the determined set of configuration settings in a file associated with the media content. In an embodiment, the server 102 may implement known encoding techniques to generate the encoded media content. The processor 202 may include the set of configuration settings in the header section of the media content. The processor 202 may also include metadata associated with the set of configuration settings in the header section of the media content. The processor 202 may encode the media content having the set of configuration settings and/or the metadata in the header section to generate the encoded media content.

At step 608, the encoded media content may be transmitted by the content server 102 to at least one of the plurality of content rendering devices 108. At step 610, the method 600 ends.

Figure 7:
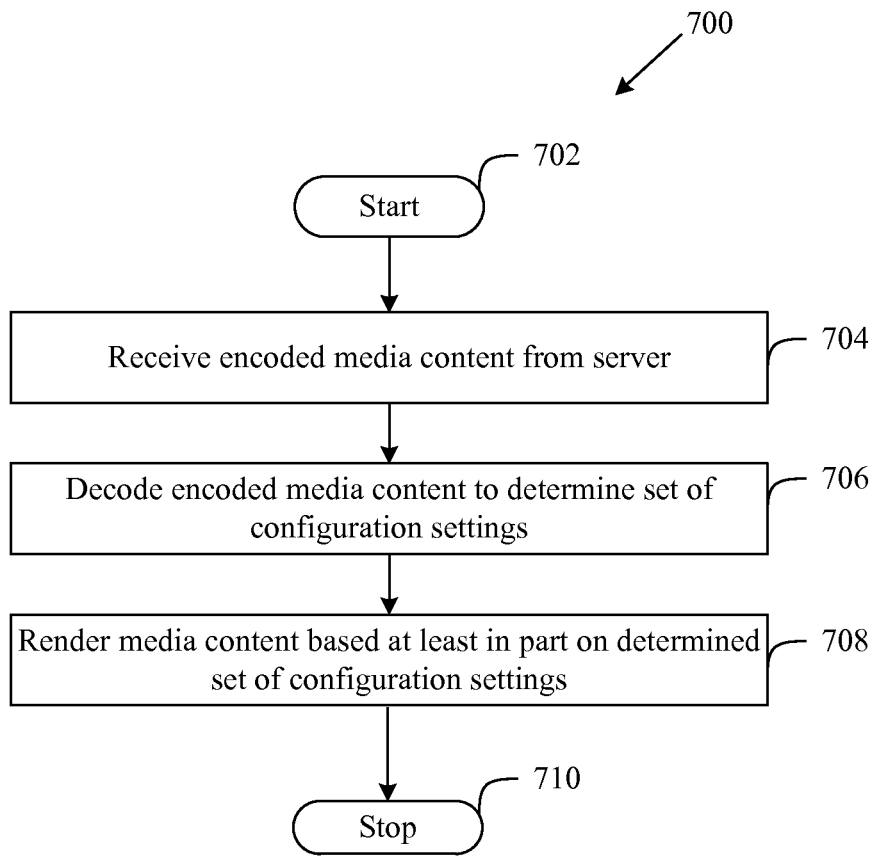
FIG. 7 is a diagram illustrating a method for rendering media content, in accordance with an embodiment of the disclosure.

FIG. 7 is a diagram illustrating a method 700 for rendering media content, in accordance with an embodiment of the disclosure. The method 700 may be implemented in a content rendering device (for example, 108a). FIG. 7 will be described in conjunction with elements of FIG. 1, FIG. 2, and FIG. 3.

The method starts at step 702. At step 704, encoded media content may be received by the content rendering device 108a from the server 102 or the content provider 104. The encoded media content may include metadata associated with a set of configuration settings in the header section of the media content. The metadata may include one or more of an external storage location of the set of configuration settings, a parsing specification for parsing the header section, a manner of applying the set of configuration settings, a minimum threshold and a maximum threshold for each of the set of configuration settings, and caching information associated with the header section of said media content. In an embodiment, the metadata may include the set of configuration settings. The set of configuration settings may include one or more of a volume setting, a contrast setting, a brightness setting, an aspect ratio setting, a surround sound setting, a refresh rate setting, a color setting, a resolution setting, a zoom setting, a font setting, and/or a page view setting.

At step 706, the encoded media content may be decoded by the content rendering device 108a to determine the set of configuration settings. At step 708, the media content may be rendered by the content rendering device 108a based on the determined set of configuration settings. In an embodiment, the processor 302 may modify the current set of configuration settings of the content rendering device 108a to reflect the determined set of configuration settings. The modification of configuration settings may be temporary and the processor 302 may be operable to reset the configurations settings to the previous settings. At step 710, the method 700 ends.

In an embodiment, a set of environmental factors may be determined by the content rendering device 108a. The processor 302 may be operable to modify the set of configuration settings based on the set of environmental factors. In another embodiment, a user input for applying the set of configuration settings may be received from the user. The processor 302 may modify the set of configuration settings based on the user input.

In an embodiment, the processor 302 may receive and decode another encoded media content to determine a new set of configuration settings. The processor 302 may be operable to detect a termination of the current rendering of the media content. The processor 302 may modify the set of configuration settings to match the determined new set of configuration settings and may render the newly received media content based on the modified set of configuration settings.

In accordance with an embodiment of the disclosure, a server 102 (FIG. 1) for communicating media content may be communicatively coupled to a plurality of content rendering devices 108. The server 102 may comprise one or more processors, for example, processor 202 (FIG. 2) that may be operable to determine a set of configuration settings associated with the media content based on a set of parameters. The processor 202 may be operable to encode the media content and the determined set of configuration settings to generate an encoded media content. The determined set of configuration settings may be included in a header section of the encoded media content. The processor 202 may be operable to transmit the encoded media content to at least one of the plurality of content rendering devices 108.

The determined set of configuration settings may comprise one or more of a volume setting, a contrast setting, a brightness setting, an aspect ratio setting, a surround sound setting, a refresh rate setting, a color setting, a resolution setting, a zoom setting, a font setting, and a page view setting.

The set of parameters may comprise a device type associated with one or more of the plurality of content rendering devices 108, a content type associated with the media content, a history of configuration settings associated with one or more of the plurality of content rendering devices 108, a bit rate associated with the media content, and a set of environmental factors associated with one or more of the plurality of content rendering devices 108. In an embodiment, the set of environmental factors may include size of a room, surrounding noise, surrounding acoustic characteristics, lighting, viewing distance, and the number of people in a room where one or more of said plurality of content rendering devices are located.

The processor 202 may be operable to determine the device type based on a request for the media content from one or more of the plurality of content rendering devices 108. The processor 202 may be operable to receive the history of configuration settings associated with one or more of the plurality of content rendering devices 108. The processor 202 may be operable to receive, in runtime, the set of environmental factors associated with one or more of the plurality of content rendering devices 108. The processor 202 may be operable to include the determined set of configuration settings in the header section of the media content. The processor 202 may be operable to include a metadata associated with the determined set of configuration settings in the header section of the media content. The metadata may comprise one or more of external storage location of determined set of configuration settings, a parsing specification for parsing the header section, a manner of applying the determined set of configuration settings, a minimum threshold and a maximum threshold for each of the determined set of configuration settings, and caching information associated with the header section of the media content.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A server for processing media content for communication, said server comprising:
one or more processors coupled to a memory operable to:
determine a set of configuration settings associated with said media content based on a set of parameters;
encode said media content and said determined set of configuration settings to generate an encoded media content, wherein metadata comprising at least one of an external storage location of said determined set of configuration settings and a minimum threshold and a maximum threshold for each of said determined set of configuration settings, is included in a header section of said media content, wherein said determined set of configuration settings are modified to reflect configuration settings associated with said media content; and
transmit said encoded media content to at least one of a plurality of content rendering devices.

2. The server of claim 1, wherein said determined set of configuration settings comprises one or more of: a volume setting, a contrast setting, a brightness setting, an aspect ratio setting, a surround sound setting, a refresh rate setting, a color setting, a resolution setting, a zoom setting, a font setting, or a page view setting.

3. The server of claim 1, wherein said set of parameters comprises one or more of: a device type associated with one or more of said plurality of content rendering devices, a content type associated with said media content, a history of configuration settings associated with one or more of said plurality of content rendering devices, a bit rate associated with said media content, or a set of environmental factors associated with one or more of said plurality of content rendering devices.

4. The server of claim 3, wherein said one or more processors are operable to determine said device type based on a request for said media content from one or more of said plurality of content rendering devices.

5. The serve of claim 3, wherein said one or more processors are operable to receive said set of environmental factors associated with one or more of said plurality of content rendering devices.

6. The server of claim 3, wherein said set of environmental factors comprises one or more of: a size of a room, surrounding noise, surrounding acoustic characteristics, lighting, a viewing distance, and number of people to a room where one or more of said plurality of content rendering devices are located.

7. The server of claim 1, wherein said metadata comprises caching information associated with said header section of said encoded media content.

8. A method for rendering media content, said method comprising:
in a content rendering device:
receiving encoded media content, wherein said encoded media content comprises metadata associated with a set of configuration settings in a header section of said encoded media content, said metadata comprising at least one of an external storage location of said set of configuration settings and a minimum threshold and a maximum threshold for each of said set of configuration settings, wherein said set of configuration settings are determined based on a comparison between a current set of configuration settings and said minimum threshold and said maximum threshold;
decoding said received encoded media content to determine said set of configuration settings; and
rendering said media content based on said determined set of configuration settings.

9. The method of claim 8, wherein said metadata comprises caching information associated with said header section of said encoded media content.

10. The method of claim 8, wherein said set of configuration settings comprises one or more of: a volume setting, a contrast setting, a brightness setting, an aspect ratio setting, a surround sound setting, a refresh rate setting, a color setting, a resolution setting, a zoom setting, a font setting, or a page view setting.

11. The method of claim 8, comprising updating a current set of configuration settings of said content rendering device with said determined set of configuration settings.

12. The method of claim 8, comprising modifying said set of configuration settings based on a user input.

13. The method of claim 12, comprising rendering said media content based on said modified set of configuration settings.

14. The method of claim 8, comprising receiving and decoding another encoded media content to determine a new set of configuration settings.

15. The method of claim 14, comprising detecting a termination of a current said rendered media content.

16. The method of claim 15, comprising modifying said set of configuration settings to match said determined new set of configuration settings.

17. The method of claim 16, comprising rendering said decoded another media content based on said modified set of configuration settings.

18. A method for processing media content for communication, said method comprising:

in a server communicably coupled to a plurality of content rendering devices:

determining a set of configuration settings associated with said media content based on a set of parameters, wherein said determined set of configuration settings are included in a file;

encoding said media content and said file to generate encoded media content, wherein metadata comprising at least one of an external storage location of said determined set of configuration settings and a minimum threshold and a maximum threshold for each of said determined set of configuration settings, is included in a header section of said media content, wherein said determined set of configuration settings are modified to reflect configuration settings and said minimum threshold and said maximum threshold; and transmitting said encoded media content to at least one of said plurality of content rendering devices.

19. The method of claim 18, wherein said media content comprises a video content, an audio content, an audio-visual content, a web page, an image, and/or a live broadcast content.

* * * * *